(12) United States Patent
Shen et al.

(10) Patent No.: US 12,486,636 B2
(45) Date of Patent: Dec. 2, 2025

(54) EVALUATION MODEL DESIGN METHOD AND EVALUATION METHOD OF SOIL PLUG EXTRUSION EFFECT IN OFFSHORE WIND POWER PILE FOUNDATION

(71) Applicant: Shanghai Investigation, Design & Research Institute Co., Ltd., Shanghai (CN)

(72) Inventors: Panpan Shen, Shanghai (CN); Jie Zhou, Shanghai (CN)

(73) Assignee: Shanghai Investigation, Design & Research Institute Co., Ltd., Shanghai (CN)

( * ) Notice: Subject to any disclaimer, the term of this patent is extended or adjusted under 35 U.S.C. 154(b) by 0 days.

(21) Appl. No.: 18/574,083

(22) PCT Filed: Apr. 21, 2023

(86) PCT No.: PCT/CN2023/089878
§ 371 (c)(1),
(2) Date: May 21, 2024

(87) PCT Pub. No.: WO2024/060608
PCT Pub. Date: Mar. 28, 2024

(65) Prior Publication Data
US 2025/0215656 A1 Jul. 3, 2025

(30) Foreign Application Priority Data
Sep. 23, 2022 (CN) .......................... 202211167726.5

(51) Int. Cl.
*E02D 33/00* (2006.01)
*G01N 3/06* (2006.01)
(Continued)

(52) U.S. Cl.
CPC ............. *E02D 33/00* (2013.01); *G01N 3/068* (2013.01); *G01N 3/08* (2013.01); *G01N 33/24* (2013.01); *G06F 30/13* (2020.01)

(58) Field of Classification Search
CPC ......... E02D 33/00; G06F 30/13; G01N 3/068; G01N 3/08; G01N 3/24; G01N 3/062
(Continued)

(56) References Cited

U.S. PATENT DOCUMENTS

| 5,325,702 A | 7/1994 | Verstraeten | |
|---|---|---|---|
| 2014/0044554 A1* | 2/2014 | Lafferty | ................. E02D 27/42 29/889 |

FOREIGN PATENT DOCUMENTS

| CN | 101979783 A | 2/2011 |
|---|---|---|
| CN | 103835323 A | 6/2014 |

(Continued)

OTHER PUBLICATIONS

English translation of CN 110029692, Jul. 19, 2019. (Year: 2019).*
English translation of CN 205636831, Oct. 12, 2016. (Year: 2016).*
English translation of CN 103953074, Apr. 20, 2016. (Year: 2016).*
English translation of CN 108760601, Oct. 11, 2019. (Year: 2019).*

*Primary Examiner* — Michael P Nghiem
(74) *Attorney, Agent, or Firm* — IPRTOP LLC

(57) ABSTRACT

An assessment model design method and an assessing method for soil plugging and soil squeezing effects of an offshore wind power pile foundation are disclosed, including: S1, setting up a model box, designing a similarity ratio for a model test, and determining dimensions of a model pile; S2, setting a pile installation position in the model box, setting three measurement positioning circles, setting measurement positioning lines along radial directions of the pile installation position, intersections of the measurement positioning lines with the three circles serve as measurement points; S3, filling the model box with test soil according to specified requirements; S4, installing a CPTU measurement
(Continued)

system, including CPTU probes placed at the measurement points and connected to a CPTU data acquisition device, and a CPTU penetration mechanism; the CPTU data acquisition device is connected to a computer; S5, installing the model pile, loading system, and axial force detection system.

9 Claims, 2 Drawing Sheets

(51) Int. Cl.
  *G01N 3/08* (2006.01)
  *G01N 33/24* (2006.01)
  *G06F 30/13* (2020.01)
(58) Field of Classification Search
  USPC ............................................................ 702/2
  See application file for complete search history.

(56) References Cited

FOREIGN PATENT DOCUMENTS

| | | | | |
|---|---|---|---|---|
| CN | 103953074 | Y | 7/2014 | |
| CN | 104515734 | A | 4/2015 | |
| CN | 205636831 | Y | 10/2016 | |
| CN | 106836317 | A | 6/2017 | |
| CN | 108760601 | Y | 11/2018 | |
| CN | 110029692 | Y | 7/2019 | |
| CN | 112229357 | A | 1/2021 | |
| CN | 115573397 | P | 1/2023 | |
| KR | 102397962 | A | 5/2022 | |
| WO | WO-0140581 | A1 * | 6/2001 | ............ E02B 17/021 |
| WO | WO-2012152483 | A3 * | 3/2013 | ......... E02B 17/0004 |
| WO | WO-2024060608 | A1 * | 3/2024 | ............. G01N 33/24 |

* cited by examiner

EVALUATION MODEL DESIGN METHOD AND EVALUATION METHOD OF SOIL PLUG EXTRUSION EFFECT IN OFFSHORE WIND POWER PILE FOUNDATION

TECHNICAL FIELD

The present disclosure relates to the field of geotechnical engineering, in particular, to an assessment model design method and an assessing method for soil plugging and soil squeezing effects of an offshore wind power pile foundation.

BACKGROUND

Under the development trend of utilizing green energy, offshore wind power, as a form of clean energy, has irreplaceable advantages such as high energy efficiency and minimal land resource occupation, and is rapidly developing worldwide. Offshore wind turbines often use monopile foundations, and the soil plugging and soil squeezing effects are important factors affecting the safety and stability of the foundation. Traditional methods for assessing earth pressure and pore water pressure of pile foundations have disadvantages such as difficulty in data collection and poor effectiveness.

Cone Penetration Test (CPT) is an important in-situ testing technique in the field of geotechnical engineering, currently mainly used for soil layer classification, site liquefaction determination, estimation of physical and mechanical parameters of foundation soil layers, assessment of foundation bearing capacity, and estimation of pile bearing capacity, among others. In particular, the Piezocone Penetration Test (CPTU) is currently an important reference for the design parameters of offshore wind power pile foundations. It has the advantages of being intuitive, fast, and providing continuous data. It allows for the direct acquisition of test soil layer indicators such as penetration resistance on-site, intuitively reflecting the physical and mechanical properties of the soil around the pile.

In the existing technology, due to the complex marine environment, it is often quite difficult to carry out on-site bearing capacity tests and other in-situ tests for offshore wind power pile foundations, and the data obtained is also difficult to be analyzed due to too many influencing factors, especially an effective assessment of effects such as soil plugging effect and soil squeezing effect, which have a significant impact on the bearing capacity of offshore pile foundations, are difficult to be directly obtained.

SUMMARY

The present disclosure provides an assessment model design method and an assessing method for soil plugging and soil squeezing effects of an offshore wind power pile foundation. By adopting a model test approach, it can conveniently, accurately, and systematically assess the soil plugging and soil squeezing effects of pile foundations, with controllable influencing factors and low cost.

The assessment model design method for soil plugging and soil squeezing effects of the offshore wind power pile foundation includes the following steps:

S1, setting up a model box, designing a similarity ratio for a model test according to a size of an actual pile foundation and a size of the model box, and determining dimensions of a model pile;

S2, setting a pile installation position in the model box, and setting a first measurement positioning circle, a second measurement positioning circle, and a third measurement positioning circle with the center of the pile installation position as the center of the three circles, where the diameters of the first measurement positioning circle, the second measurement positioning circle, and the third measurement positioning circle are respectively 1D to 2D, 5D to 6D, and 6D to 10D, where D is the diameter of the model pile; setting multiple measurement positioning lines along radial directions of the pile installation position, where intersections of the measurement positioning lines with the first measurement positioning circle, the second measurement positioning circle, and the third measurement positioning circle serve as measurement points;

S3, filling the model box with test soil according to specified requirements;

S4, installing a CPTU measurement system, where the CPTU measurement system comprises a CPTU penetration mechanism, multiple CPTU probes, and a CPTU data acquisition device, where the CPTU probes are positioned at the measurement points on the measurement positioning lines, the CPTU probes are connected to the CPTU data acquisition device, the CPTU penetration mechanism is configured to penetrate the CPTU probes into the test soil, and the CPTU data acquisition device is connected to a computer;

S5, installing the model pile, a loading system, and an axial force detection system, where the model pile is set at the pile installation position, the loading system is connected to the model pile for applying a load to the model pile, and the axial force detection system is connected to the computer.

Further, in the step S2, the pile installation position is located at the center of the model box.

Further, in the step S2, the measurement positioning lines have an even number, where the measurement positioning lines are evenly distributed around the pile installation position, where each of the measurement positioning lines is configured for measurement of the model pile under a certain level of load.

Further, in the step S2, a distance L between the measurement points is greater than 10d, where d is the diameter of each of the CPTU probes configured for measurements at the measurement points.

Further, in the step S3, the test soil is prepared according to a standard for geotechnical testing method GB/T 50123-2019, where the filling of the test soil is uniform and compact, and fully saturated.

Further, in the step S4, the CPTU measurement system further comprises a positioning track, where the positioning track is installed above the measurement positioning lines, where the CPTU probes are mounted on the positioning track, and are configured to move on the positioning track to the measurement points.

Further, in the step S5, the axial force detection system comprises an optic fiber sensor and an optic fiber data acquisition device, where the optic fiber sensor is installed in the model pile, the optic fiber sensor is connected to the optic fiber data acquisition device, and the optic fiber data acquisition device is connected to the computer.

The present disclosure further provides an assessing method for soil plugging and soil squeezing effects of an offshore wind power pile foundation, including:

A, assessing the soil squeezing effect of the pile foundation, comprising the following steps:

A1, setting an assessment model by using the assessment model design method as described above;

A2, before driving the model pile into the test soil, obtaining CPTU baseline values of the test soil through the CPTU measurement system;

A3, applying a preset load on the model pile through the loading system according to test requirements, and driving the model pile into the test soil; obtaining an axial force of the model pile through the axial force detection system; by using the CPTU measurement system, obtaining CPTU measurement values of the test soil at the measurement points on one of the measurement positioning lines under the load;

A4, analyzing and assessing the soil squeezing effect of the pile foundation based on the load as well as the axial force of the model pile and the CPTU measurement values under the load;

B, assessing the soil plugging effect of the pile foundation, comprising the following steps:

B1, setting up two types of assessment models by using the assessment model design method as described above, where the two types of assessment models comprise a first type of assessment model and a second type of assessment model, where a difference between the first type of assessment model and the second type of assessment model is that they use different model piles, where the first type of assessment model uses an open-ended model pile, and the second type of assessment model uses a closed-ended model pile;

B2, performing the following operations on the two types of assessment models: applying a preset load on the model pile through the loading system according to test requirements, and driving the model pile into the test soil; obtaining the axial force of the model pile through the axial force detection system; by using the CPTU measurement system, obtaining CPTU measurement values of the test soil at measurement points on a certain measurement positioning line under the load;

B3, comparing the CPTU measurement values obtained from the two types of assessment models to assess the soil plugging effect.

Further, in the steps A3 and B2, a method for applying the load by the loading system on the model pile comprises stepwise static loading or cyclic dynamic loading, where load directions of the load comprise horizontal and vertical directions.

Further, in the steps A3 and B2, the loading system applies the load on the model pile by stepwise static loading, where at each load level, measurements are taken at the measurement points on one of the measurement positioning lines by using the CPTU measurement system.

As mentioned above, the assessment model design method and the assessing method involved in the present disclosure have the following beneficial effects.

1) By conducting design model tests to assess the soil plugging and soil squeezing effects of the offshore wind power pile foundation, it is more cost-effective compared to on-site tests, with controllable influencing factors. It enables convenient, accurate, and systematic assessment of soil plugging and soil squeezing effects of the offshore wind power pile foundation, avoiding the difficulties of on-site testing at sea.

2) CPTU data is of high precision and large quantity, capable of directly reflecting the properties of the foundation soil, facilitating the assessment of soil plugging and soil squeezing effects.

3) The types of variables that can be set in the model include pile type, load direction, model type, duration, etc., which facilitates the study of the impact of different factors on the properties of pile foundations.

4) The loading of the model pile and the penetration process of CPTU probes can both be automatically controlled by the computer, making the test operations simple.

REFERENCE NUMERALS

Figure 1:
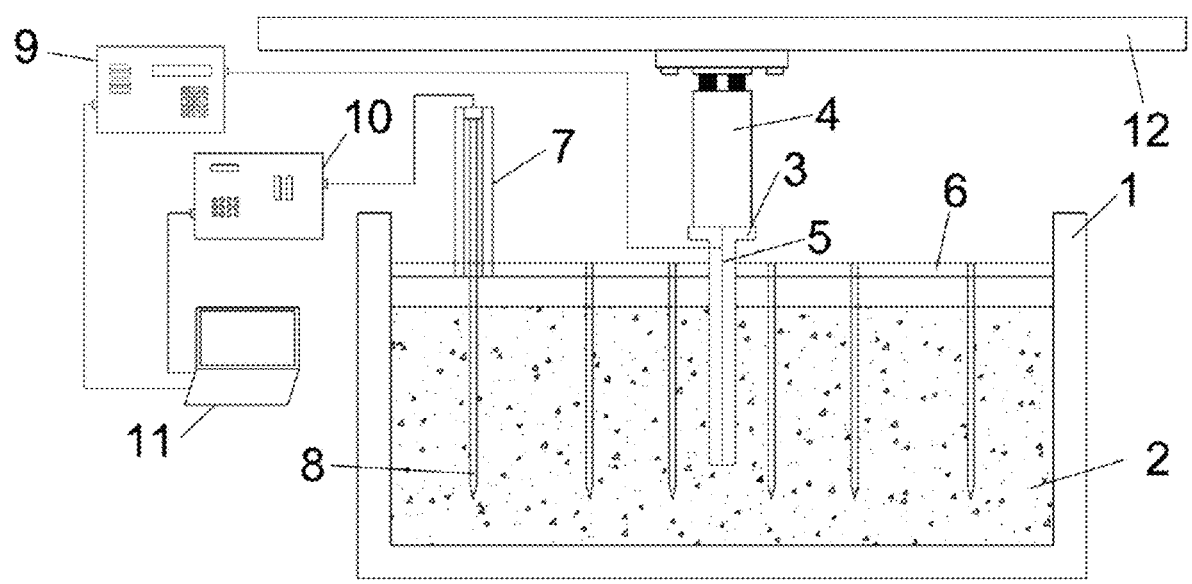
FIG. 1 is a schematic diagram of an assessment model designed by the present disclosure.

1 Model box
2 Test soil
3 Model pile
4 Loading system
5 Optical fiber sensor
6 Positioning track
7 CPTU penetration mechanism
8 CPTU probe
9 Optical fiber data acquisition device
10 CPTU data acquisition device
11 Computer
12 Truss
13 Pile installation position
14 First measurement positioning circle
15 Second measurement positioning circle
16 Third measurement positioning circle
17 Measurement positioning line
18 Measurement point

DETAILED DESCRIPTION

The embodiments of the present disclosure are illustrated by the following specific examples, and those skilled in the art can easily understand other advantages and effects of the present disclosure from the content disclosed in this specification.

It should be understood that the structures, proportions, sizes, and the like, which are illustrated in the drawings of the present specification, are used to clarify the content disclosed in the specification for understanding and reading by those skilled, and are not intended to limit the implementation of the present disclosure. Any modification of the structure, change of the proportion, or adjustment of the size should still fall within the scope of the technical content disclosed by the present disclosure without affecting the effects and achievable objectives of the present disclosure. In the meantime, the terms "top", "bottom", "left", "right", and "middle" as used in this specification are also for the convenience of description, and are not intended to limit the scope of the present disclosure, and the change or adjustment of the relative relationship is considered to be within the scope of the present disclosure without substantial changes in technology.

Figure 2:
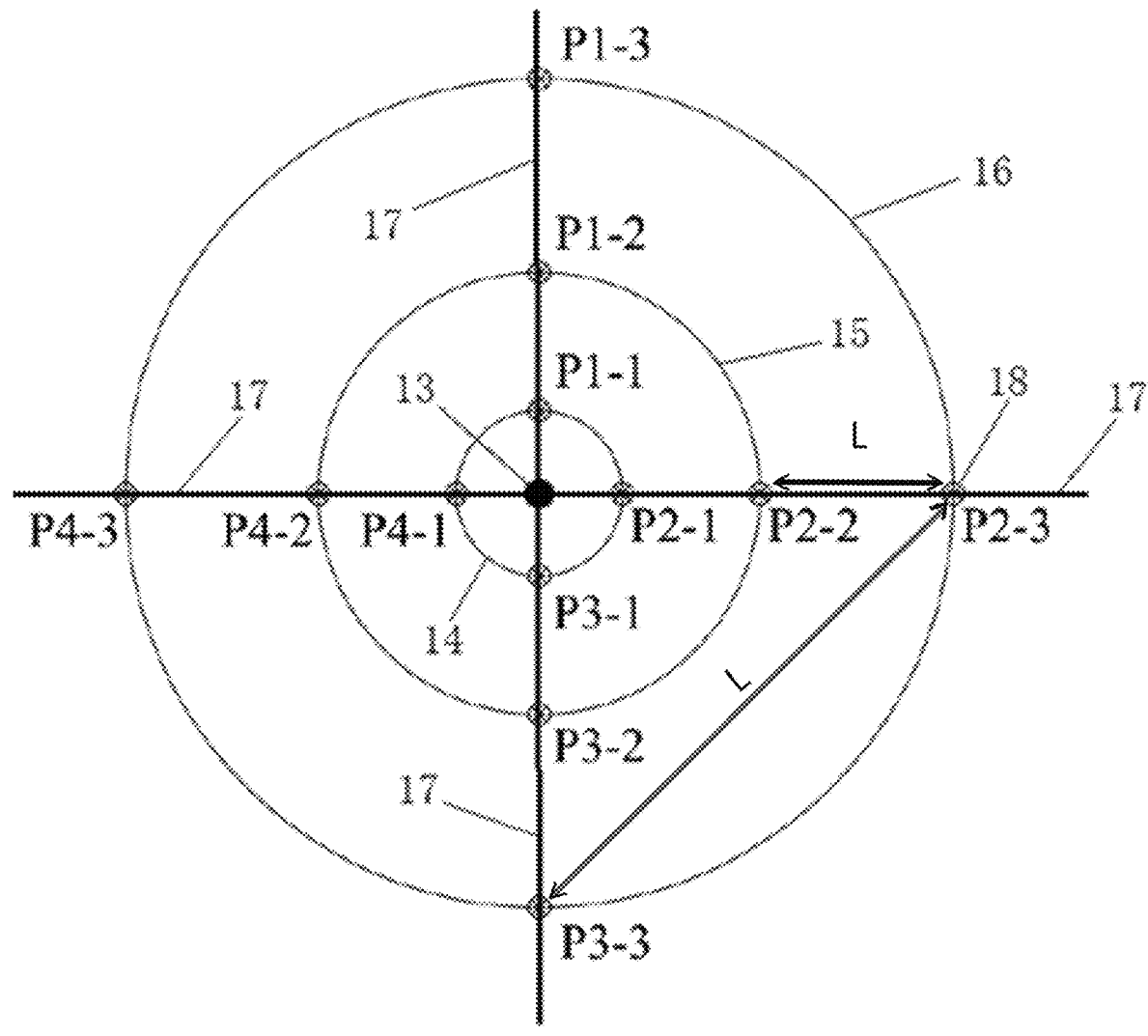
FIG. 2 is a schematic diagram showing the positions of the measurement positioning lines and measurement points in the present disclosure.

Referring to FIGS. 1 to 2, the present disclosure provides an assessment model design method for soil plugging and soil squeezing effects of an offshore wind power pile foundation. The assessment model includes a model box 1, test soil 2, a model pile 3, a loading system 4, a CPTU measurement system, and an axial force detection system. The assessment model design method includes the following steps.

S1, setting up the model box 1, where dimensions of the model box 1 are determined according to the actual situation; designing a similarity ratio for a model test based on the size of an actual pile foundation and the size of the model box; determining dimensions of the model pile 3, where the dimensions of the model pile 3 include a radius D of the model pile 3; and making the model pile 3.

S2, setting a pile installation position 13 for the model pile 3 in the model box 1, where the pile installation position 13 is a circular area, and setting a first measurement positioning circle 14, a second measurement positioning circle 15, and a third measurement positioning circle 16 with the center of the pile installation position 13 as the center of the three circles. The diameters of the first measurement positioning circle 14, the second measurement positioning circle 15, and the third measurement positioning circle 16 are respectively 1D to 2D, 5D to 6D, and 6D to 10D, where D is the diameter of the model pile 3. The pile installation position 13 is preferably located at the center of the model box 1. The first measurement positioning circle 14, the second measurement positioning circle 15, and the third measurement positioning circle 16 respectively represent three positional areas near the pile body of the model pile 3, at the edge of the plastic zone, and outside the plastic zone.

Straight lines are set along radial directions of the pile installation position 13, serving as measurement positioning lines 17. The intersections of the measurement positioning lines 17 with the first measurement positioning circle 14, the second measurement positioning circle 15, and the third measurement positioning circle 16 serve as the measurement points 18. The measurement points 18 are used for the measuring and positioning of CPTU probes 8 of the CPTU measurement system. The number of the measurement positioning lines 17 is determined based on the conditions (including load grading, load cycle time, and other factors) of the load applied to the model pile 3, with an even number of measurement positioning lines 17 being preferred. Referring to FIG. 2, in this embodiment, there are four measurement positioning lines 17, which are evenly distributed around the pile installation position 13, that is, the measurement positioning lines 17 are spaced 90° apart, symmetrically in pairs, and the four measurement positioning lines 17 are used for the measurement of the model pile 3 under P1 to P4 levels of load, respectively. Correspondingly, the four measurement positioning lines 17 are numbered P1 to P4. For any measurement positioning line numbered Pn, the measurement points 18 on it are respectively numbered as Pn-1, Pn-2, and Pn-3 from the inside to the outside, that is, from the first measurement positioning circle 14 to the second measurement positioning circle 15, and then to the third measurement positioning circle.

Preferably, a distance L between the measurement points 18 is greater than $10d$. Specifically, the distance L between the measurement points 18 on the same measurement positioning line 17, as well as the distance L between the measurement points 18 on different measurement positioning lines 17, are all greater than $10d$, where d is the diameter of the CPTU probes 8, to ensure that when subsequent measurements are taken using the CPTU probes 8 of the CPTU measurement system, the CPTU probes 8 will not interfere with each other.

S3, filling the model box 1 with the test soil 2 according to specified requirements. Specifically, in this embodiment, taking the seabed soil from the sea area where the offshore wind power pile foundation is located, and preparing the test soil 2 according to the geotechnical test method standard GB/T 50123-2019, ensuring the soil is filled evenly, compactly, and is fully saturated.

S4, installing the CPTU measurement system. The CPTU measurement system includes a CPTU penetration mechanism 7, the CPTU probes 8, and a CPTU data acquisition device 10. The CPTU probes 8 are positioned at the measurement points 18 on the measurement positioning lines 17. The CPTU probes 8 are connected to the CPTU data acquisition device 10, and can transmit the measured data to the CPTU data acquisition device 10. The CPTU penetration mechanism 7 can enable the CPTU probes 8 to penetrate into the test soil 2; the CPTU data acquisition device 10 is connected to a computer 11 and can transmit data to the computer 11 for storage, analysis, and calculation. In the present disclosure, the size of each part of the CPTU measurement system is chosen according to the size of the model box, and since the assessment model is usually completed indoors, a miniature CPTU measurement system is selected.

As a preferred design, in this embodiment, the CPTU measurement system further includes a positioning track 6, which is installed above the measurement positioning lines 17. The CPTU probes 8 are mounted on the positioning track 6 and can move on the positioning track 6 to align with the measurement points 18. Specifically, the positioning track 6 includes four horizontal tracks and a switching track. The four horizontal tracks are respectively set directly above the four measurement positioning lines 17 and are parallel to the measurement positioning lines 17. The CPTU probes 8 can move on the horizontal tracks to align with different measurement points 18. The switching track connects the horizontal tracks and is used for the CPTU probes 8 to allow them to move from one horizontal track to another. The movement of the CPTU probes 8 on the positioning track 6 is controlled by the computer 11, which can control the CPTU probes 8 to move to the corresponding measurement positioning lines 17 based on the loading situation.

S5, installing the model pile 3, the loading system 4, and the axial force detection system. The model pile 3 is set at the pile installation position 13, and the loading system 4 is connected to the model pile 3 for applying loads to the model pile 3, where the loads include lateral and vertical loads. The loading system 4 can drive the model pile 3 into the test soil 2, as well as apply various loads to the model pile 3 that has been driven into the test soil 2. The axial force detection system is used to detect the axial force of the model pile 3, and it is connected to the computer 11 to transmit the detection data to the computer 11 for storage and computational analysis.

In this embodiment, the loading system 4 is installed on a truss 12 above the model box 1 and is firmly connected to the model pile 3. The loading system 4 has a power system that meets the test requirements and is controlled by the computer 11 to start and stop the loading, as well as to adjust the magnitude and the applying method of the load. The axial force detection system includes an optical fiber sensor 5 and an optical fiber data acquisition device 9. The optical fiber sensor 5 is installed in the model pile 3 and continuously monitors the axial force of the model pile 3 during the test; the optical fiber sensor 5 is connected to the optical fiber data acquisition device 9, which in turn is connected to the computer 11. In other embodiments, the axial force detection system can also have other suitable structures that can achieve the above-mentioned real-time monitoring of the axial force of the model pile 3.

The assessment model design method of the present disclosure can be used to assess the soil plugging and soil squeezing effects of pile foundations. It adopts a model test approach based on CPTU technology, which can conveniently, accurately, and systematically assess the soil plugging and soil squeezing effects of pile foundations. Compared to on-site tests, the influencing factors of the present disclosure are controllable and the cost is low.

The present disclosure also provides an assessing method for soil plugging and soil squeezing effects of an offshore wind power pile foundation, which includes two parts: the assessment of the soil squeezing effect of the pile foundation and the assessment of the soil plugging effect of the pile foundation, specifically as follows:

A, the assessment of the soil squeezing effect of the pile foundation, including the following steps A1 to A4.

A1, setting an assessment model by using the assessment model design method described above. In this embodiment, multiple measurement positioning lines 17 with an even number are set in the assessment model, and the measurement positioning lines 17 are evenly distributed around the pile installation position 13.

A2, before driving the model pile 3 into the test soil 2, measuring the test soil 2 by using the CPTU measurement system to obtain multiple physical parameters of the test soil 2, including cone tip resistance, side wall friction resistance, pore water pressure, and other parameters, which serve as the CPTU baseline values of the test soil 2.

A3, applying a preset load on the model pile 3 through the loading system 4 according to test requirements, and driving the model pile 3 into the test soil 2; obtaining an axial force of the model pile 3 through the axial force detection system; by using the CPTU measurement system, obtaining physical parameters of the test soil 2 at measurement points 18 on a certain measurement positioning line 17 under the load, where these physical parameters serve as CPTU measurement values of the test soil 2; transmitting the axial force data and the CPTU measurement values from the CPTU measurement system to the computer 11.

Specifically, according to the actual axial load on the pile foundation, the pile pressing load for the model test is designed based on the similarity theory. The loading system 4 applies the load to the model pile 3, which can be either stepwise static loading or cyclic dynamic loading, to study the effect of different loads on the soil squeezing effect of the offshore wind power pile foundation. When using the stepwise static loading, at each load level, the CPTU probes 8 are used to measure the test soil at three measurement points 18 on one measurement positioning line 17, as shown in FIG. 2. In this embodiment, the pile pressing load is divided into four levels, denoted as load P1 to load P4. When pressing the pile with load P1, the CPTU probes 8 test the test soil at positions P1-1, P1-2, and P1-3 and record parameters such as cone tip resistance, side wall friction resistance, and pore water pressure, and the axial force of the model pile 3 is monitored by the fiber optic sensor 5. Then, in the same manner, loads P2 to P4 are applied, and measurements are taken at three measurement points 18 on measurement positioning lines 17 corresponding to P2 to P4, completing the pile pressing test. During the test, the computer controls the loading system 4 to change the loads, meanwhile controls the CPTU probes 8 to move on the positioning track 6 to the measurement positioning lines 17 corresponding to the loads, and to the corresponding measurement points 18.

A4, analyzing and assessing the soil squeezing effect of the pile foundation based on the load as well as the axial force of the model pile and CPTU measurement values under the load; specifically, the soil squeezing effect of the pile foundation can be analyzed based on the axial force of the model pile 3 under different loads and the CPTU measurement values at three measurement points 18 of the test soil 2, and in conjunction with the CPTU baseline values of the test soil 2 before pressing the pile in step A2.

In the assessment of the soil squeezing effect of the pile foundation, the model pile 3 can be either an open-ended pile or a closed-ended pile. By changing the type of the model pile 3, the soil squeezing effect of different types of piles can be studied.

B, the assessment of the soil plugging effect of the pile foundation, including the following steps.

B1, setting up two types of assessment models by using the assessment model design method described above. The difference between the two types of assessment models is that they use different types of model piles 3. One uses an open-ended pile, while the other uses a closed-ended pile. The rest of their structures are the same.

B2, performing the following operations on the two types of assessment models: applying a preset load on the model pile 3 through the loading system 4 according to test requirements, and driving the model pile 3 into the test soil 2; obtaining an axial force of the model pile 3 through the axial force detection system; by using the CPTU measurement system, obtaining CPTU measurement values of the test soil 2 at measurement points 18 on a certain measurement positioning line 17 under the load. In this step, specifically, according to the actual axial load on the pile foundation, the pile pressing load for the model test is designed according to the similarity theory. The method for applying load by the loading system 4 on the model pile 3 can be either stepwise static loading or cyclic dynamic loading, to study the effect of different loads on the soil squeezing effect of the offshore wind power pile foundation. When using the stepwise static loading, at each load level, the CPTU probes 8 are used to measure the test soil at three measurement points 18 on one measurement positioning line 17.

B3, comparing the CPTU measurement values obtained from the two types of assessment models to assess the soil plugging effect, that is, assessing the soil plugging effect by comparing the CPTU measurement values of the open-ended pile and the closed-ended pile under the same conditions.

The assessment model design method and assessing method of the present disclosure are used for offshore wind power pile foundations and can also be used for pile foundations in other application scenarios.

From the above, it can be known that compared with the existing technology, the present disclosure has the following advantages.

1) By conducting design model tests to assess the soil plugging and soil squeezing effects of the offshore wind power pile foundation, it is more cost-effective compared to on-site tests, with controllable influencing factors. It enables convenient, accurate, and systematic assessment of soil plugging and soil squeezing effects of the offshore wind power pile foundation, avoiding the difficulties of on-site testing at sea.

2) CPTU data is of high precision and large quantity, capable of directly reflecting the properties of the foundation soil, facilitating the assessment of soil plugging and soil squeezing effects.

3) The types of variables that can be set in the model include pile type, load direction, model type, duration, etc., which facilitates the study of the impact of different factors on the properties of pile foundations.

4) The loading of the model pile 3 and the penetration process of CPTU probes can both be automatically controlled by the computer 11, making the test operations simple.

In summary, the present disclosure effectively overcomes various shortcomings in the prior art and has high industrial application value.

The above-mentioned embodiments are just used for exemplarily describing the principle and effects of the present disclosure instead of limiting the present disclosure. Those skilled in the art can make modifications or changes to the above-mentioned embodiments without going against the spirit and the scope of the present disclosure. Therefore, all equivalent modifications or changes made by those who have common knowledge of the art without departing from the spirit and technical concept disclosed by the present disclosure shall be still covered by the claims of the present disclosure.

The invention claimed is:

1. An assessing method for soil plugging and soil squeezing effects of an offshore wind power pile foundation, setting an assessment model by using an assessment model design method for assessment, wherein the assessment model design method comprises the following steps:

S1, setting up a model box (1), designing a similarity ratio for a model test according to a size of pile foundation and a size of the model box (1), and determining dimensions of a model pile (3);

S2, setting a pile installation position (13) in the model box (1), and setting a first measurement positioning circle (14), a second measurement positioning circle (15), and a third measurement positioning circle (16) with the pile installation position (13) as a center of the three circles (14, 15, 16), wherein diameters of the first measurement positioning circle (14), the second measurement positioning circle (15), and the third measurement positioning circle (16) are respectively 1D to 2D, 5D to 6D, and 6D to 10D, wherein D is the diameter of the model pile (3);

setting a plurality of measurement positioning lines (17) along radial directions of the pile installation position (13), wherein intersections of the plurality of measurement positioning lines (17) with the first measurement positioning circle (14), the second measurement positioning circle (15), and the third measurement positioning circle (16) serve as measurement points (18);

S3, filling the model box (1) with test soil (2) according to specified requirements;

S4, installing a Piezocone Penetration Test (CPTU) measurement system, wherein the CPTU measurement system comprises a plurality of CPTU probes (8), and a CPTU data acquisition device (10), wherein the plurality of CPTU probes 8 is positioned at the measurement points (18) on the plurality of measurement positioning lines (17), the plurality of CPTU probes (8) is connected to the CPTU data acquisition device (10), and the CPTU data acquisition device (10) is connected to a computer (11);

S5, installing the model pile (3), a loading system (4), and an axial force detection system, wherein the model pile (3) is set at the pile installation position (13), the loading system (4) is connected to the model pile (3) for applying a load to the model pile (3), and the axial force detection system is connected to the computer (11);

wherein the assessing method comprises:

A, assessing the soil squeezing effect of the pile foundation, comprising the following steps:

A1, setting an assessment model by using the assessment model design method;

A2, before driving the model pile (3) into the test soil (2), obtaining CPTU baseline values of the test soil (2) through the CPTU measurement system;

A3, applying a preset load on the model pile (3) through the loading system (4) according to test requirements, and driving the model pile (3) into the test soil (2);

obtaining an axial force of the model pile (3) through the axial force detection system; by using the CPTU measurement system, obtaining CPTU measurement values of the test soil (2) at the measurement points (18) on one of the plurality of measurement positioning lines (17) under the load;

A4, analyzing and assessing the soil squeezing effect of the pile foundation based on the load as well as the axial force of the model pile (3) and the CPTU measurement values under the load;

B, assessing the soil plugging effect of the pile foundation, comprising the following steps:

B1, setting up two types of assessment models by using the assessment model design method, wherein the two types of assessment models comprise a first type of assessment models and a second type of assessment models, wherein a difference between the first type of assessment model and the second type of assessment model is use each type of assessment models uses different model piles (3), wherein the first type of assessment model uses an open-ended model pile, and the second type of assessment model uses a closed-ended model pile;

B2, performing the following operations on the two types of assessment models:

applying a preset load on the model pile (3) through the loading system (4) according to test requirements, and driving the model pile (3) into the test soil (2); obtaining the axial force of the model pile (3) through the axial force detection system; by using the CPTU measurement system, obtaining CPTU measurement values of the test soil (2) at measurement points (18) on one of the plurality of measurement positioning lines (17) under the present load;

B3, comparing the CPTU measurement values obtained from the two types of assessment models to assess the soil plugging effect.

2. The assessing method according to claim 1, wherein in the steps A3 and B2, a method for applying the present load by the loading system (4) on the model pile (3) comprises stepwise static loading or cyclic dynamic loading, wherein load directions of the present load comprise horizontal and vertical directions.

3. The assessing method according to claim 2, wherein in the steps A3 and B2, the loading system (4) applies the present load on the model pile (3) by stepwise static loading, wherein at each load level, measurements are taken at the measurement points (18) on one of the plurality of measurement positioning lines (17) correspondingly by using the CPTU measurement system.

4. The assessing method according to claim 1, wherein in the step S2, the pile installation position (13) is located at the center of the model box (1).

5. The assessing method according to claim 1, wherein in the step S2, the measurement positioning lines (17) have an even number, wherein the plurality of measurement positioning lines (17) is evenly distributed around the pile installation position (13), wherein each of the plurality of measurement positioning lines (17) is configured for measurement of the model pile (3) under a certain level of load.

6. The assessing method according to claim 1, wherein in the step S2, a distance L between the measurement points (18) is greater than 10$d$, wherein d is the diameter of each of the plurality of CPTU probes (8) configured for measurements at the measurement points (18).

7. The assessing method according to claim 1, wherein in the step S3, the test soil (2) is prepared according to a standard for geotechnical testing method GB/T 50123-2019, wherein a filling of the test soil (2) is uniform and compact, and fully saturated.

8. The assessing method according to claim 1, wherein in the step S4, the CPTU measurement system further comprises a positioning track (6), wherein the positioning track (6) is installed above the plurality of measurement positioning lines (17), wherein the plurality of CPTU probes (8) is mounted on the positioning track (6), and is configured to move on the positioning track (6) to the measurement points (18).

9. The assessing method according to claim 1, wherein in the step S5, the axial force detection system comprises an optic fiber sensor (5) and an optic fiber data acquisition device (9), wherein the optic fiber sensor (5) is installed in the model pile (3), the optic fiber sensor (5) is connected to the optic fiber data acquisition device (9), and the optic fiber data acquisition device (9) is connected to the computer (11).

* * * * *